United States Patent [19]
Roose

[11] Patent Number: 5,170,746
[45] Date of Patent: Dec. 15, 1992

[54] PORTABLE LIVESTOCK PEN

[76] Inventor: Gerald L. Roose, 409 Farmer St., Pella, Iowa 50219

[21] Appl. No.: 779,325

[22] Filed: Oct. 18, 1991

[51] Int. Cl.$^5$ ............ A01K 1/02; E06B 3/32; B62D 33/04
[52] U.S. Cl. .................... 119/20; 49/380; 49/413; 256/73; 296/24.2; 296/50
[58] Field of Search .............. 119/20, 98, 155; 280/79.3; 296/3, 12, 14, 24.2, 50; 256/24, 25, 73; 49/370, 380, 407, 413, 453, 501, 504

[56] References Cited

U.S. PATENT DOCUMENTS

| | | | |
|---|---|---|---|
| 182,688 | 9/1876 | Minor | 119/155 |
| 285,611 | 9/1883 | Gosshorn | 296/50 |
| 382,843 | 5/1888 | Stiles | 296/24.2 |
| 2,797,959 | 7/1957 | Brice | 296/50 |
| 3,420,569 | 1/1969 | Waldrop | 296/50 |
| 4,366,775 | 1/1983 | Tyquin | 119/20 |

Primary Examiner—Gene Mancene
Assistant Examiner—Todd E. Manahan
Attorney, Agent, or Firm—Zarley, McKee, Thomte, Voorhees & Sease

[57] ABSTRACT

A livestock pen includes a rectangular horizontal platform having a plurality of sidewall assemblies connected thereto and extending around the perimeter thereof. At least one of the sidewall assemblies includes first and second vertical posts spaced apart from one another to form a gate opening therebetween. An upper horizontal rail is connected to the upper end of one of the gate posts and extends horizontally away from the gate opening. A horizontal slide rail is attached to the one sidewall assembly and extends across the gate opening adjacent the lower end thereof. A gate includes an upper channel member slidably mounted over the upper rail of the rear wall assembly and a lower sleeve member telescoped over the slide rail at the bottom of the wall assembly so as to permit the gate to slide between open and closed positions.

8 Claims, 2 Drawing Sheets

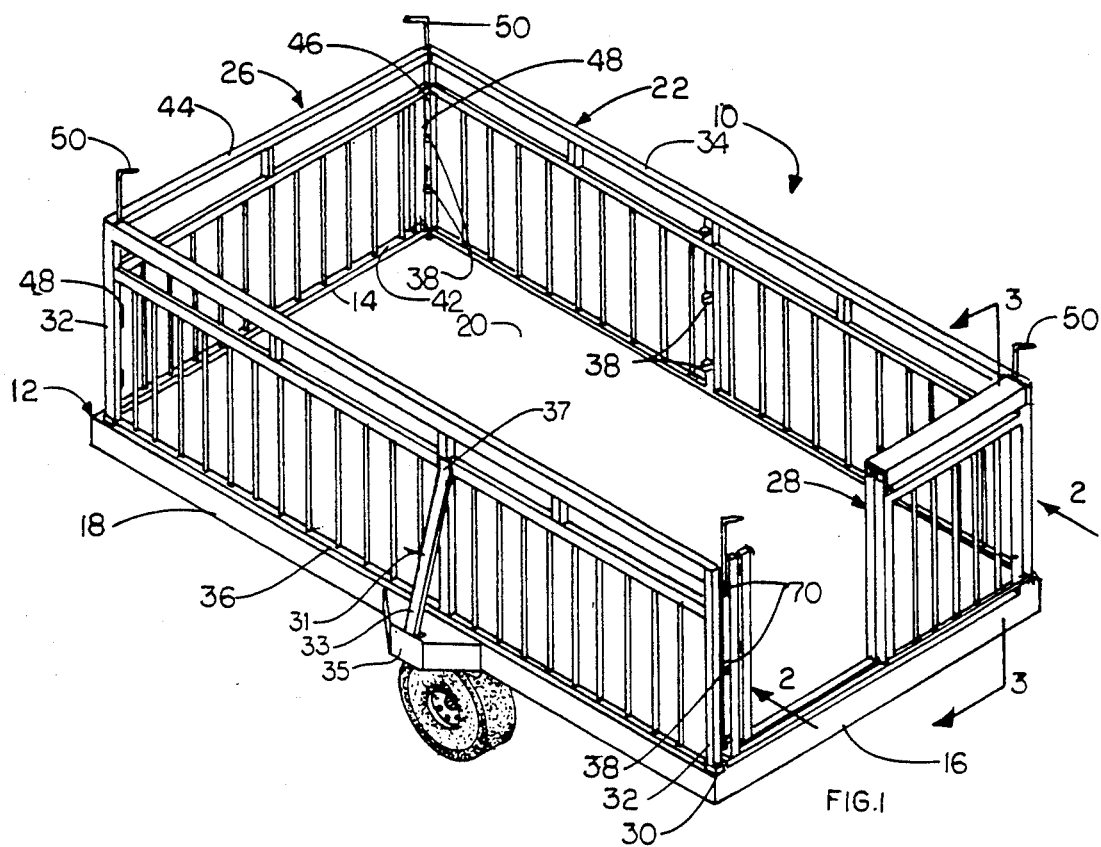
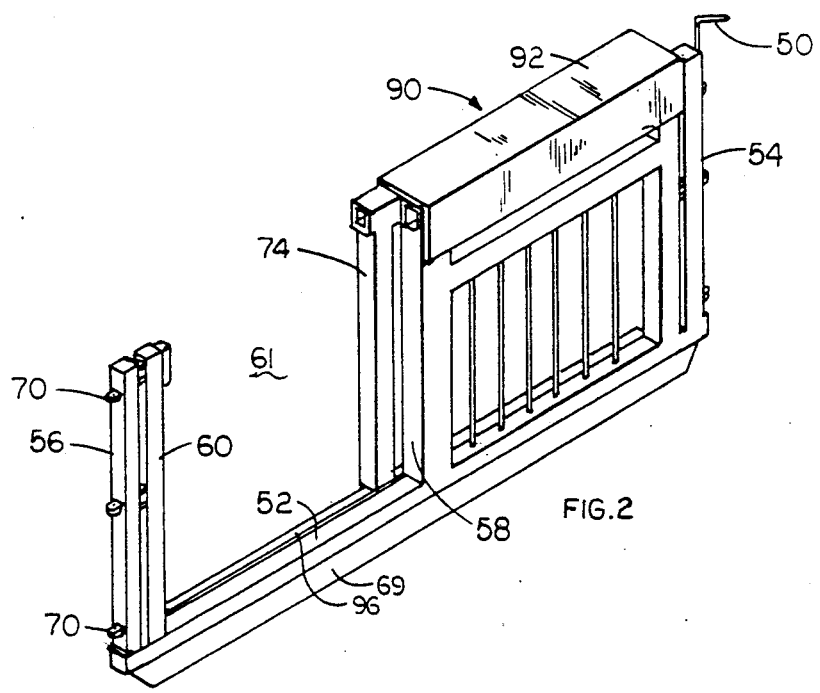

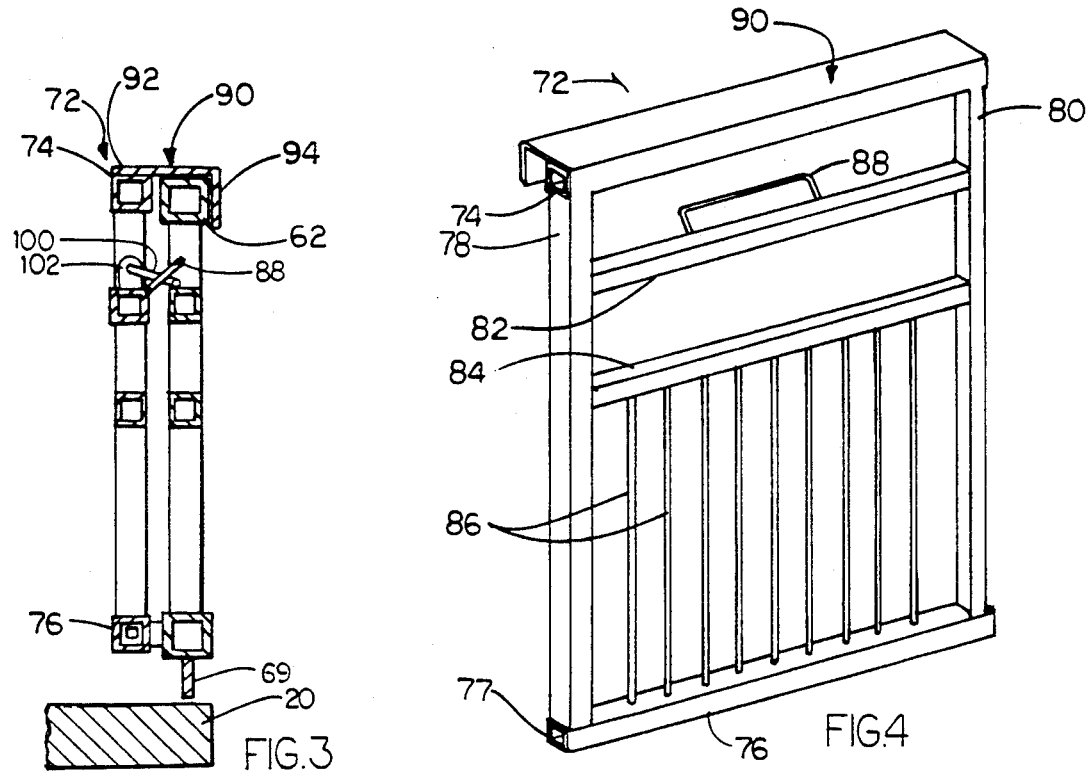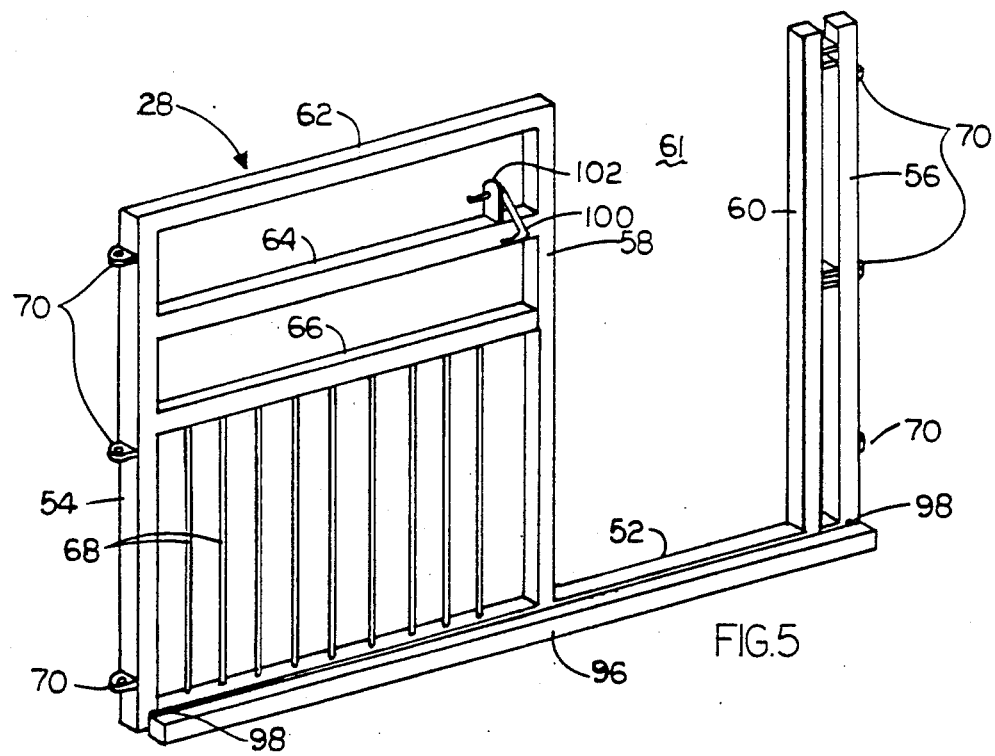

PORTABLE LIVESTOCK PEN

BACKGROUND OF THE INVENTION

This invention relates to a portable livestock pen.

Moving livestock from one area to another is a common task for farmers. Trailers have been provided for moving livestock, but it is desirable to be able to adapt the trailers for other uses.

One problem encountered with livestock trailers is the necessity for a sturdy, but easily operable gate which can be opened and closed to permit entry and exit of the livestock from the portable pen.

Therefore, a primary object of the present invention is the provision of an improved portable livestock pen.

A further object of the present invention is the provision of an improved portable livestock pen which has a sturdy and easily operable gate capable of moving between opened and closed positions.

A further object of the present invention is the provision of an improved portable livestock pen which permits the operator to pass through the gate without obstruction when the gate is open.

A further object of the present invention is the provision of an improved portable livestock pen which can be easily disassembled so as to permit the platform of the pen to be utilized as a trailer for other purposes than moving livestock.

A further object of the present invention is the provision of an improved portable livestock pen which includes a gate capable of moving slidably between its opened and closed positions.

A further object of the present invention is the provision of an improved portable livestock pen which is efficient in operation, sturdy in use, and economical to manufacture.

SUMMARY OF THE INVENTION

The present invention includes a rectangular horizontal platform having at least two ground engaging wheels rotatably mounted thereto. The platform can be utilized as a trailer and can include a conventional tongue for attachment to a tractor or other farm vehicle.

Mounted to the platform are a plurality of sidewall assemblies which are connected to the platform and which extend around the perimetric edge thereof. The sidewall assemblies are also connected to one another by interlocking pins which extend through sleeves or tubes at the end of each wall assembly.

One of the sidewall assemblies includes a pair of spaced apart vertical gate posts which form a gateway therebetween. The sidewall assembly also includes an upper horizontal rail having one end connected to the upper end of one of the vertical posts and extending horizontally away from the gate opening. Attached to the lower end of the one sidewall assembly and horizontally spaced from the upper rail of that sidewall is a slide rail which extends across the gate opening adjacent and horizontally spaced from the lower ends of the vertical gate posts. A gate having an upper horizontal frame member, a lower horizontal frame member, and a pair of spaced apart vertical frame members is formed into a rectangular shape and is sized to fit in covering relation over the gate opening. Attached to the upper horizontal frame member of the gate is an elongated channel member which extends over the upper rail member of the sidewall and which is adapted to slide longitudinally along the upper rail member of the sidewall. The lower horizontal frame member of the gate is formed into a sleeve, and is slidably mounted upon the slide rail of the sidewall assembly. The slidable mounting of the channel member to the upper horizontal rail member of the sidewall, and the slidable mounting of the lower sleeve member of the gate along the slide rail of the wall assembly permit the gate to slide from an open position adjacent the gate opening to a closed position in covering relation over the gate opening.

The weight of the gate is borne by the sleeve which is slidably mounted along the slide rail, and is also borne by the upper channel member which extends over the upper horizontal rail member of the sidewall and rests thereupon. A moveable lock is mounted on the sidewall for engaging the gate when the gate is in its closed position so as to prevent the gate from inadvertently coming open.

BRIEF DESCRIPTION OF THE FIGURES OF THE DRAWINGS

FIG. 1 is a perspective view of the portable livestock pen of the present invention.

FIG. 2 is an enlarged perspective view of the rear sidewall assembly having the moveable gate mounted thereon.

FIG. 3 is a sectional view taken along line 3—3 of FIG. 2.

FIG. 4 is a perspective view of the gate of the present invention.

FIG. 5 is a perspective view of the rear wall assembly of the present invention.

DESCRIPTION OF THE PREFERRED EMBODIMENT

Referring to the drawings, the numeral 10 generally designates the portable pen of the present invention. Pen 10 includes a rectangular platform 12 having a forward end 14, a rear end 16, and opposite lateral sides 18, 20. Mounted to the sidewalls 18, 20 and extending upwardly therefrom are a pair of sidewall assemblies 22. Extending between the two sidewall assemblies 22, at the forward and rear ends thereof are a front wall assembly 26 and a rear wall assembly 28.

Each sidewall assembly 22, rests on a wall support 30 and includes a pair of end posts 32 extending upwardly therefrom. Interconnecting the upper ends of end posts 32 is an elongated upper rail 34, and interconnecting the lower ends of end posts 32 is a lower rail 36. End posts 32 are each provided with a plurality of pin receiving tubes 38. The lower ends of end posts 32 are rigidly secured to the wall support 30 by means of a bolt or screw (not shown). Each of the side wall assemblies 22, is reinforced by a wall strut 31 having a lower end 33 connected to a strut support 35 connected to platform 12 and having an upper end 37 connected to one of the side wall assemblies 22, adjacent the upper edge thereof.

Front wall assembly 26 comprises a bottom rail 42, a top rail 44, and end posts 46. End posts 46 each include a plurality of pin receiving tubes 48 which are adapted to be registered with the pen receiving tubes 38 of the sidewalls 22, so as to receive a locking pin 50 to lock the end wall 26 to the two sidewalls 22. As can be seen in FIG. 1, additional pin receiving tubes 38 are attached to walls 22, intermediate their ends for receiving additional cross walls (not shown) which are identical to end wall 26.

Rear wall assembly 28 includes a bottom rail 52 which is connected at its opposite ends to end posts 54, 56. Also extending upwardly from bottom rail 52 are a pair of spaced apart gate posts 58, 60 which provide a gate opening 61. Rear wall assembly 28 also includes an upper rail 62 which extends between end post 54 and gate post 58. The rectangle formed by end post 54, top rail 62, gate post 58, and bottom rail 52 is filled with a pair of horizontal filler rails 64, 66 and a plurality of vertical filler posts 68. A blocking plate 69 is welded along the bottom edge of rail 52 and blocks the space between bottom rail 52 and platform 12 so that the livestock will not get their feet wedged in that space. End posts 54, 56 are provided with pin receiving tubes 70 which are adapted to be registered with the pin receiving tubes 38 at the rear ends of sidewall assemblies 22. Locking pins 50 then are inserted downwardly through the registered pin receiving tubes 38, 70 so as to secure rear wall assembly 26 to the sidewall assemblies 22.

A gate 72 includes a top gate member 74 and a bottom gate sleeve 76. Gate sleeve 76 is formed into a tubelike configuration having a rectangular bore 77 extending therethrough. A pair of vertical gate members 78, 80 innerconnect the opposite ends of top and bottom gate members 74, 76 so as to form a rectangular gate which is sized to fit in covering relation over the gate opening 61 of rear wall assembly 28. Extending horizontally between gate posts 78, 80 are a pair of horizontal filler rails 82, 84, and extending vertically between rail 84 and bottom sleeve 76 are a plurality of vertical filler posts 86. A handle 88 is welded or otherwise secured to horizontal filler rail 82.

Welded or otherwise attached to top gate member 74 is an elongated angle channel 90 having in cross section a horizontal flange 92 and a vertical flange 94. As can be seen in FIG. 3, the horizontal flange 92 extends from top gate member 84 over the top of the top rail member 62, and the vertical flange 94 extends downwardly therefrom to slidably embrace the interior surface of top rail member 62. The weight of the gate 72 is partially borne by the horizontal flange 92 resting upon the top rail member 62.

Attached to the bottom of rear wall assembly 28 is a horizontal slide rail 96 which is held in horizontal spaced relation to bottom rail 52 by means of a pair of connecting stubs 98 at the opposite ends thereof. The bottom gate sleeve 76 is slidably mounted over the slide rail 96 with the slide rail 96 slidably extending within rectangular bore 77 of gate 72. Thus, the gate 72 is firmly attached to the slide rail 96 by means of gate sleeve 76 and also by means of the L-shaped angle channel 90. At the same time, gate 72 is free to slide from an open position shown in FIG. 2 to a closed position, wherein the gate is in covering relation over gate opening 61. In the closed position, angle channel 90 is nearly completely removed from the top rail 62, with only a small portion of one end still resting upon the top rail 62. The gate 72, however, is held firmly in place by virtue of the slidable mounting of bottom gate sleeve 76 over slide rail 96. The rectangular cross sectional configuration of rectangular bore 77 cooperates with the rectangular configuration of slide rail 96 so as to prevent the gate 72 from tilting or pivoting about a horizontal axis located along the length of rail 96. Also, it should be noted that in its closed position, the channel member 90 rests upon and partially surrounds the upper end of gate post 60 so as to further stabilize the gate in its closed position.

A lock lever 100 is pivotally mounted to a hinge mount 102 which is attached to the filler rails 64 of rear wall assembly 28. Lock lever 100 is pivotal to its lock position which is shown in FIG. 5 for engaging the vertical post 80 of gate 72 when the gate is in its closed position so as to prevent the gate from receding from its closed position. The lever 100 may be pivoted out of engagement with the vertical post 80 to permit the opening of the gate.

The gate disclosed in the present invention is simple in construction and is very sturdy. The particular construction shown and described in this application can be utilized for all types of livestock, including pigs, cattle, sheep or other animals, and is sufficiently sturdy to withstand the rigorous buffeting and abuse caused by such livestock. The end walls, 26, 28 can be easily removed merely by removing pins 50 at the four corners of the trailer so that the trailer can be utilized for other applications. Thus, it can be seen that the device accomplishes at least all of its stated objectives.

I claim:

1. A livestock pen comprising:
    a rectangular horizontal platform having a perimetric edge extending therearound;
    a plurality of sidewall assemblies connected to said horizontal platform and extending around said perimetric edge thereof, one of said sidewall assemblies including a first vertical post and a second vertical post each having upper and lower ends and being spaced apart from one another to form a gate opening therebetween, an upper horizontal rail having one end connected to said upper end of said first vertical post and extending horizontally away from said gate opening;
    a horizontal slide rail attached to said one sidewall assembly and being horizontally spaced from said upper horizontal rail of said one sidewall assembly, said slide rail extending across said gate opening adjacent and horizontally spaced from said lower ends of said vertical posts;
    a gate formed into the shape of a rectangle sized to fit in covering relation over said gate opening;
    said gate comprising an upper channel member slidably and retentively engaging said upper horizontal rail adjacent said gate opening for longitudinally sliding movement along said upper horizontal rail;
    said gate further comprising a lower sleeve member slidably mounted to said horizontal slide rail for sliding movement thereon, whereby said gate is slidably mounted to said upper horizontal rail and said horizontal slide rail for sliding movement from an open position adjacent said gate opening to a closed position in covering relation over said gate opening.

2. A livestock pen according to claim 1 wherein at least two ground engaging wheels are rotatably mounted to said platform for permitting transporting of said platform.

3. A livestock pen according to claim 1 wherein said upper channel member includes a horizontal flange and a vertical flange forming an L-shaped cross section, said horizontal flange extending over said upper horizontal rail and said vertical flange extending downwardly on the side of said upper horizontal rail opposite from said gate.

4. A livestock pen according to claim 1 wherein said lower sleeve member includes a sleeve opening extending therethrough, said slide rail extending through said sleeve opening.

5. A livestock pen according to claim 1 wherein lock means are provided on said one side wall assembly for selectively locking said gate in said closed position.

6. A livestock pen according to claim 1 wherein said gate is positioned in a first vertical plane and said one sidewall assembly is positioned is a second vertical plane adjacent but spaced from said first vertical plane.

7. A livestock pen according to claim 6 wherein said slide rail is positioned in said first vertical plane below said gate, said upper channel member extending from said gate member over said upper horizontal rail of said one sidewall assembly.

8. A gate for use with a livestock pen comprising:
a frame assembly comprising a first vertical post and a second vertical post each having upper and lower ends and being spaced apart from one another to form a gate opening therebetween, said frame assembly having an upper horizontal rail having one end connected to said upper end of said first vertical post and extending horizontally away from said gate opening;
a horizontal slide rail attached to said frame assembly, said slide rail extending across said gate opening adjacent and horizontally spaced from said lower ends of said vertical posts;
a gate formed into the shape of a rectangle sized to fit in covering relation over said gate opening;
said gate comprising an upper channel member slidably and retentively engaging said upper horizontal rail adjacent said gate opening for longitudinal sliding movement along said upper horizontal rail;
said gate further comprising a lower sleeve member slidably mounted to said horizontal slide rail for sliding movement thereon, whereby said gate is slidable on said upper horizontal rail and said horizontal slide rail from an open position adjacent said gate opening to a closed position in covering relation over said gate opening.

* * * * *